United States Patent [19]

Fingerle

[11] Patent Number: 4,925,235
[45] Date of Patent: May 15, 1990

[54] CAB FAIRING MOUNTING FOR TRUCK

[75] Inventor: Robert F. Fingerle, Fremont, Calif.

[73] Assignee: PACCAR Inc, Bellevue, Wash.

[21] Appl. No.: 398,614

[22] Filed: Aug. 25, 1989

[51] Int. Cl.$^5$ .............................................. B60R 3/00
[52] U.S. Cl. ................................ 296/180.2; 296/183; 280/833
[58] Field of Search ............ 280/833, 834, 163, 164.1; 180/903; 296/180.1, 180.2, 35.1, 183, 185

[56] References Cited

U.S. PATENT DOCUMENTS

| | | | |
|---|---|---|---|
| D. 291,872 | 9/1987 | Simons et al. | D12/96 |
| 1,321,857 | 11/1919 | Snell | 280/834 |
| 2,090,059 | 8/1937 | McCLane | 280/833 X |
| 2,902,240 | 9/1959 | La Belle | 280/833 X |
| 3,112,950 | 12/1963 | Jaskowiak | 296/35.1 |
| 3,809,427 | 5/1974 | Bennett | 296/35.1 |
| 4,102,432 | 7/1978 | Bustin | 280/163 X |
| 4,121,691 | 10/1978 | Poplawski | 280/163 X |
| 4,286,777 | 9/1981 | Brown | 296/35.1 X |
| 4,819,980 | 4/1989 | Sakata et al. | 296/35.1 |
| 4,836,568 | 6/1989 | Preslik et al. | 296/180.1 X |

FOREIGN PATENT DOCUMENTS 49741  4/1982  European Pat. Off. ........... 296/35.1

OTHER PUBLICATIONS

Europe's Sleek Lightweight Trucks, *Mechanix Illustrated*, Gordon Wilkins, p. 96, vol. 79, No. 667, Dec. 1983.
*Automotive News*, Apr. 14, 1986, p. E20.
*Automotive News*, Jan. 7, 1985, p. 22.

*Primary Examiner*—Margaret A. Focarino
*Assistant Examiner*—Gary C. Hoge
*Attorney, Agent, or Firm*—Flehr, Hohbach, Test, Albritton & Herbert

[57] ABSTRACT

An assembly for mounting a cab skirt fairing panel over a truck's fuel tank region. The panel is attached to a cab step at the front end of the fuel tank and a step arrangement at the back end of the fuel tank. The cab step, and thus the panel, is supported by a V-shaped structure which remains rigid vertically, but flexes horizontally. Similarly, the connection for the step arrangement, and thus the panel, includes bolting assemblies with flexible members which provide rigid vertical support, but flex in response to pressures in the horizontal direction. Thus, the panel is able to support weight and at the same time, flexibly withstand destructive counteractive forces imposed upon it. An additional feature of the invention is that a number of mounting positions are provided for securing the step arrangement to the truck. This feature enables a minimal number of embodiments of the step arrangement to uniformly accommodate a single panel which can cover all fuel tank sizes.

6 Claims, 4 Drawing Sheets

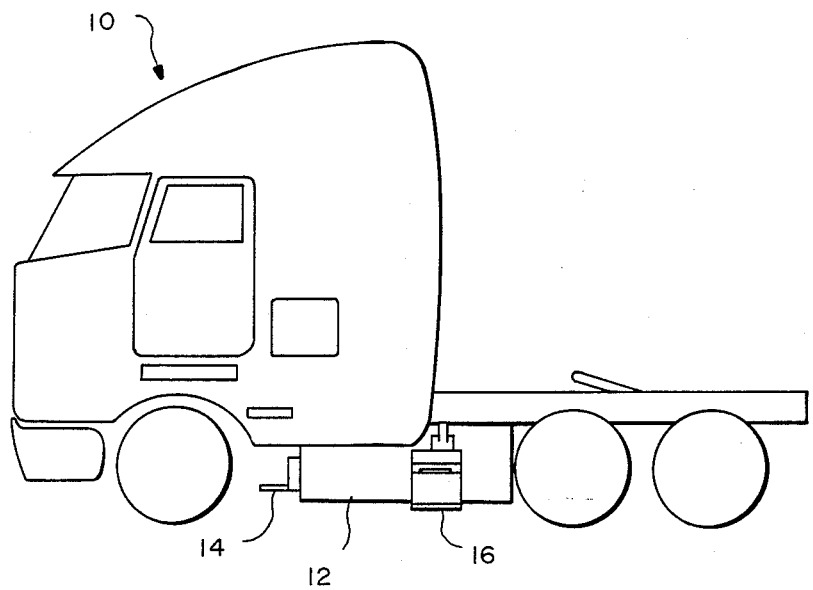
(PRIOR ART)
FIG.—1
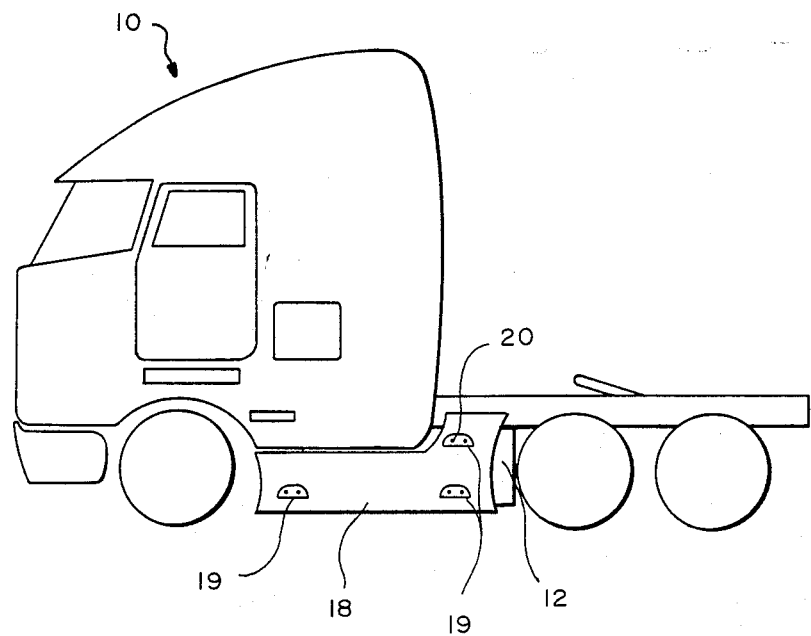
FIG.—2

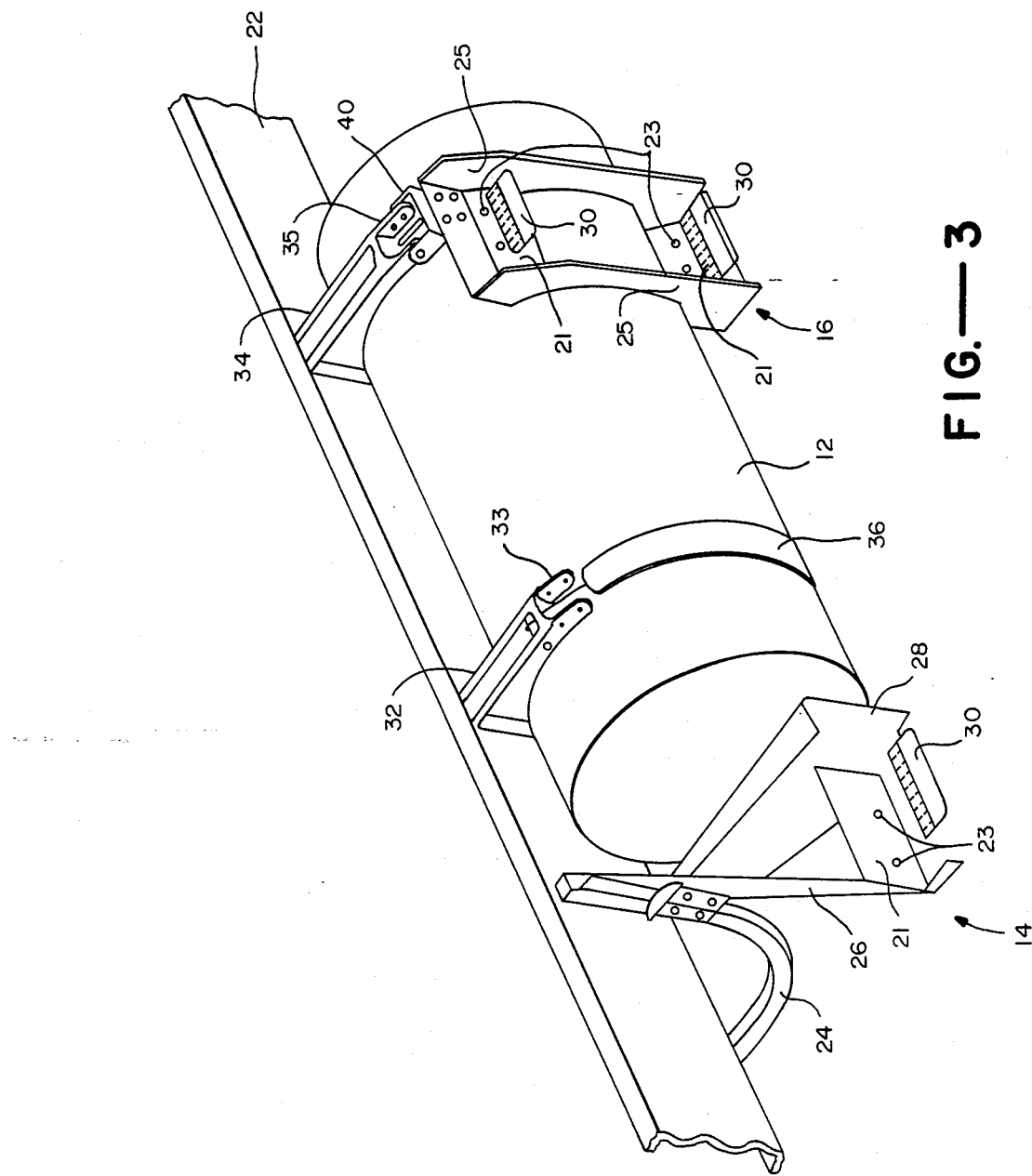
FIG.—3

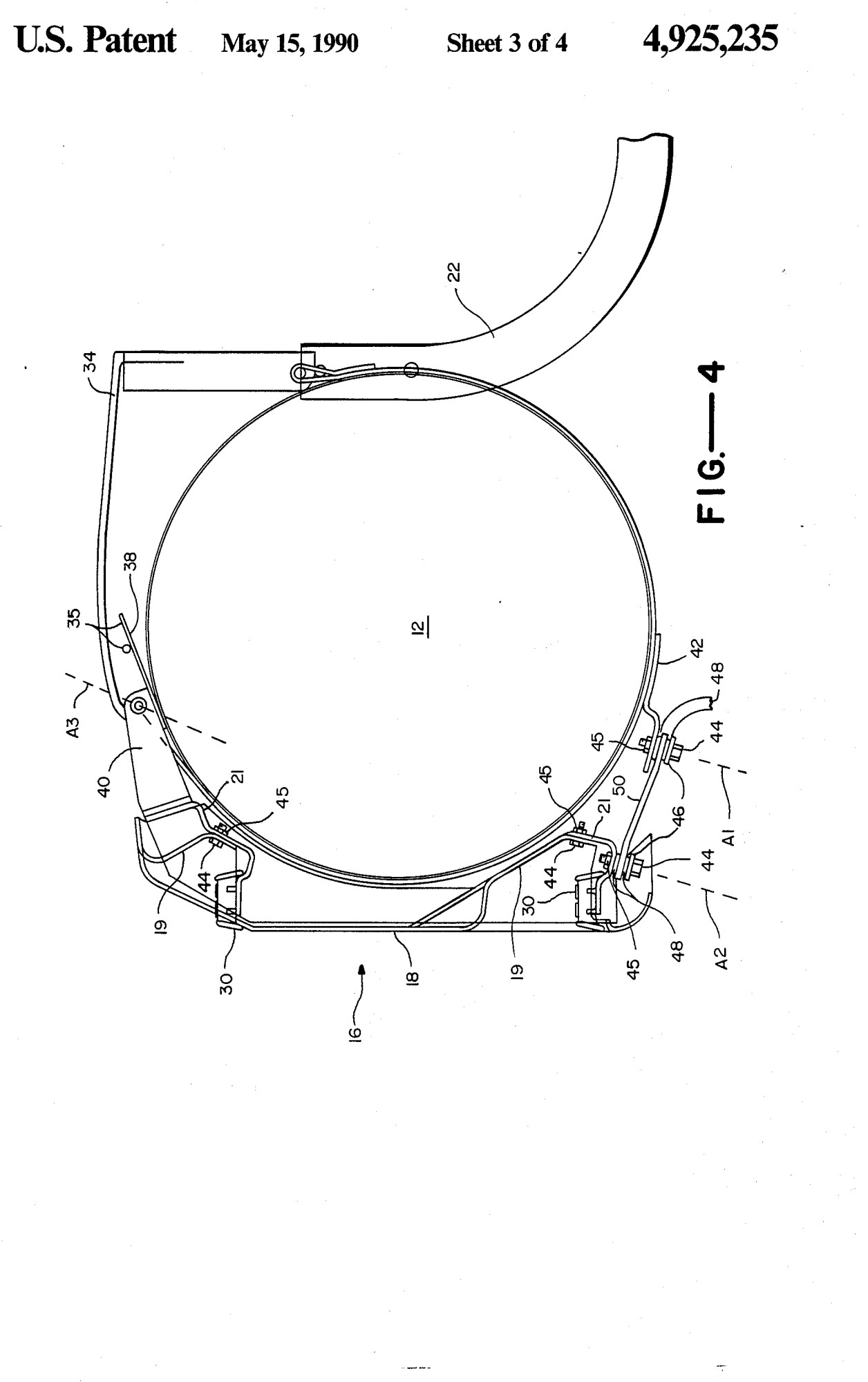

FIG.—4

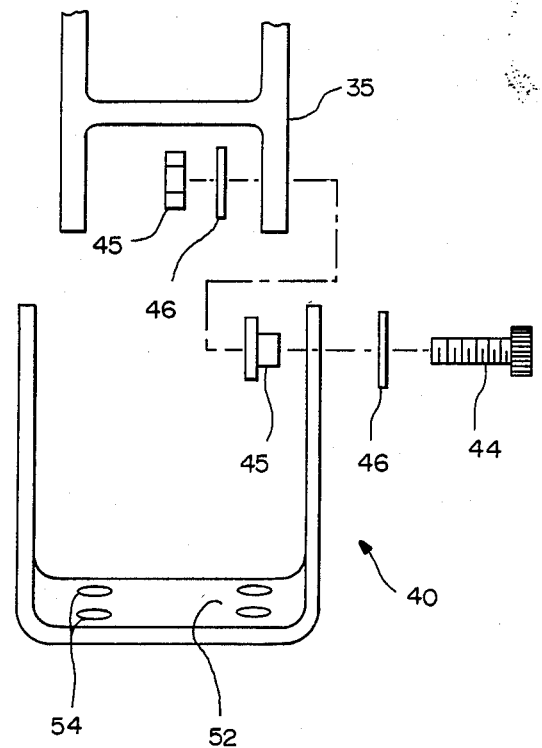
FIG.—5
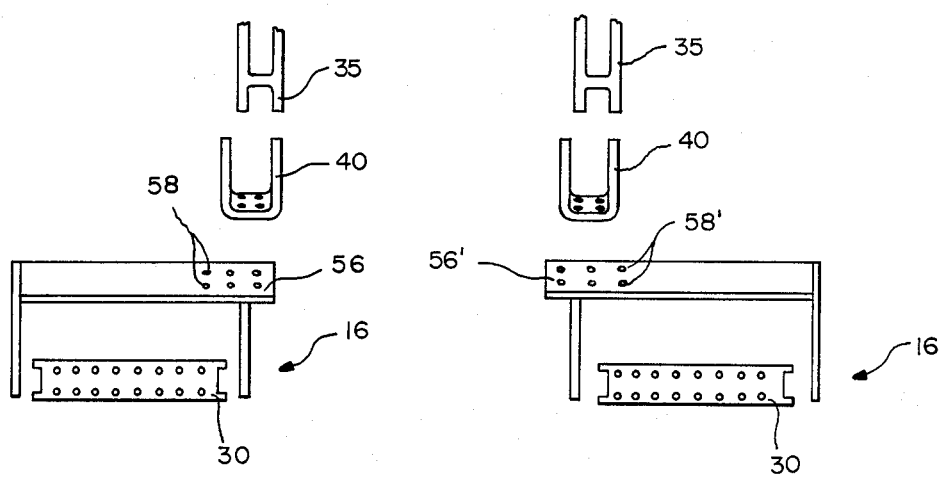
FIG.—6  FIG.—7

CAB FAIRING MOUNTING FOR TRUCK

BRIEF DESCRIPTION OF THE INVENTION

This invention relates generally to cab skirt fairings for reducing aerodynamic drag on trucks. More particularly, it relates to a mounting assembly for overcoming the difficulties associated with securing a cab skirt fairing panel which fits over a cab step positioned near the front of a fuel tank and extends from that position over a region including a step arrangement mounted near the rear of the fuel tank.

BACKGROUND OF THE INVENTION

"Cab Over" trucks, which are well known in the art, include a cab at the front of the vehicle from which the driver operates the vehicle. Typically, a fuel tank is positioned beneath and to the rear of the cab. The fuel tank of such a truck typically includes a pair of steps mounted on the rear portion of the tank, thereby facilitating access to the area behind the cab. At the front portion of the fuel tank, one typically finds a step leading to the cab of the truck. The aforementioned steps and fuel tank create considerable airflow disturbances. As a result, fuel economy is diminished.

The aerodynamic deficiencies of this area can be reduced by utilizing a cab skirt fairing panel. The problem with such an approach is that the fairing panel must extend along the length of the truck, this requires support structures along that length. As such, the support structures are attached to different regions of the vehicle and are thereby exposed to different forces in response to the truck's movement.

There are numerous examples of destructive forces acting on a fairing panel. One example is the situation wherein the front wheel of the truck hits a bump in the road. In this case, the frame at the front of the truck twists more than the frame at the rear of the truck. Since the fairing panel is attached at both regions, it is exposed to counteractive forces which tend to damage the fairing panel. Another type of force levied upon a fairing panel would be the resultant force when a person effectively steps on the panel to reach either the cab or the engine area.

In these instances, and others, damage to the fairing panel and its neighboring areas results. The damage may appear in a variety of forms: disengaged fairing panel mountings, a fractured fairing panel, or a disjointed step as a consequence of impact with the fairing panel.

Another problem associated with providing cab skirt fairing panels for trucks relates to the additional hardware associated with such an assembly. For instance, a single truck style includes options for a number of different sized fuel tanks. Thus, one is compelled to stock a variety of sizes in fairing panels. In the alternative, one can stock one size fairing panel and an array of hardware for mounting the step arrangement at a precise position to accommodate the single size fairing panel. Either option entails expensive maintenance of inventory.

OBJECTS AND SUMMARY OF THE INVENTION

It is a general object of the present invention to provide a mounting assembly to support an aerodynamic fairing panel.

More particularly, it is an object of the present invention to provide a mounting assembly so that a truck cab skirt fairing panel which covers a step, fuel tank, and steps mounted on the fuel tank is able to withstand the variety of counteractive forces to which it is exposed.

A related object of the present invention is to provide a mounting assembly which is rigid in a direction vertical to the road, but flexes in the direction horizontal to the road and thereby absorbs the prevalent forces imposed upon the fairing panel.

Another object of the present invention is to provide a mounting assembly, with a minimal number of parts, which can be utilized on a variety of different sized fuel tanks.

The foregoing and other objects are achieved by an assembly for mounting a cab skirt fairing panel over a truck's fuel tank region. The panel is attached to a cab step at the front end of the fuel tank and a step arrangement at the back end of the fuel tank. The cab step, and thus the panel, is supported by a V-shaped structure which remains rigid vertically, but flexes horizontally. Similarly, the connection for the step arrangement, and thus the panel, includes bolting assemblies with flexible members which provide rigid vertical support, but flex in response to pressures in the horizontal direction. Thus, the panel is able to support weight and at the same time, flexibly withstand destructive counteractive forces imposed upon it. An additional feature of the invention is that a number of mounting positions are provided for securing the step arrangement to the truck. This feature enables a minimal number of embodiments of the step arrangement to uniformly accommodate a single panel which can cover all fuel tank sizes.

BRIEF DESCRIPTION OF THE DRAWINGS

Other objects and advantages of the invention will become apparent upon reading the following detailed description and upon reference to the drawings, in which:

FIG. 1 is a side view of a typical truck with its fuel tank and various steps positioned in a manner to obstruct airflow around the vehicle.

FIG. 2 is a side view of a truck with its fuel tank and various steps covered by a cab skirt fairing panel in order to improve the aerodynamic efficiency of the vehicle.

FIG. 3 is an enlarged side view of the fuel tank of a truck including a cab step at the fuel tank's forward end and a step assembly at the fuel tank's back end.

FIG. 4 is a vertical view of the back of the fuel tank; it reveals the step arrangement and its various connections, including those flexible connections of the present invention.

FIG. 5 is a plan view of the fuel tank distal shoulder brackets, the U brackets, and their novel means of affixation to provide connection between the step arrangement and the truck.

FIG. 6 is a plan view of fuel tank distal shoulder brackets, the U brackets, and the step arrangement, wherein the step arrangement has its step arrangement mount apertures on the right side.

FIG. 7 is a plan view of fuel tank distal shoulder brackets, the U brackets, and the step arrangement, wherein the step arrangement has its step arrangement mount apertures on the left side.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Referring to FIG. 1, wherein like components are designated by like reference numerals in the various figures, a truck 10 is depicted. The truck 10 includes a fuel tank 12. At or near the fuel tank 12 is a cab step 14. Similarly, on or near the fuel tank 12 is a step arrangement 16.

The figure plainly reveals that the fuel tank 12, the cab step 14, and the step arrangement 16 represent air flow obstructions. Equally apparent is the fact that in order to cover these obstructions, a fairing panel would have to be connected on or near the obstructions. That is, the panel must be connected on or near the fuel tank 12, the cab step 14, and the step arrangement 16. If the fairing panel is connected directly to the steps, it is clear that it will be exposed to any movement of the steps. Similarly, a fairing panel connected on or near the fuel tank will experience the variety of counteractive forces experienced along the length of the fuel tank.

Thus, a fairing panel covering this region will be exposed to a variety of forces which it must be able to withstand. As these forces are coming from a variety of directions, a successful approach to the problem is not obvious.

In FIG. 2, a truck 10 is once again depicted. However, the fuel tank 12, the cab step 14, the step arrangement 16 are largely shielded from view by a cab skirt fairing panel 18. By covering these components, the panel 18 reduces the aerodynamic inefficiencies of this region of the truck. The panel 18 includes cab skirt fairing panel step depressions 19. The step depressions 19 recede from the surface of the panel 18 to accommodate the cab step 14 and step arrangement 16. Preferably, each step depression 18 includes two step depression mounting bores 20 through which the panel 18 can be affixed to a mounting bracket as will be more fully described herein.

While the exterior appearance of the fairing panel 18 is readily appreciated from FIG. 2, the figure provides no indication of how the rigid panel will be able to absorb the variety of forces imposed upon it. The fairing panel mounting which makes the configuration of FIG. 2 possible, will presently be revealed.

FIG. 3 depicts how the fuel tank 12 is attached to the truck. The figure also depicts the structure of a typical cab step 14. In addition, the figure reveals how the step arrangement 16 is attached to the fuel tank region.

The truck frame rail 22 supports a fuel tank proximate shoulder 32 and a fuel tank distal shoulder 34. Fuel tank proximate shoulder 32 includes fuel tank proximate shoulder bracket 33 which supports a fuel tank proximate strap 36 surrounding the tank 12 and thereby providing support for it. In the same manner, fuel tank 12 distal shoulder bracket 35 supports a fuel tank distal strap 38 (as more fully appreciated in FIG. 4).

At the proximate end of the fuel tank 12, as seen in FIG. 3, the cab step 14 is positioned. The cab step 14 is supported by a cross tie 24. Stemming from the cross tie 24 is a skirt mount front 28 and a bracket skirt mount angle 26. These two members, preferably formed from aluminum, provide a rigid vertical support and a pliant horizontal support for step platform 30 and panel mounting bracket 21. As its name intimates, step platform 30 is utilized as a step. Similarly, panel mounting bracket 21 is used in conjunction with panel mounting bracket apertures 23, in order to align with step depression mounting bores 20. By driving bolts through the aligned apertures and bores, one can securely fasten the panel 18 to the panel mounting bracket 21. To the extent that the panel mounting bracket 21 is directly supported by the step arrangement 14, as previously described, this step arrangement serves as a mounting for the panel 18.

Similarly, mounting support for the panel 18 is found on the step arrangement 16. Still referring to FIG. 3, the step arrangement 16, in a preferable embodiment, is seen to rest on the distal portion of the fuel tank 12. More specifically, the step arrangement 16 includes a U bracket 40 at its distal end. The U bracket 40 is attached to the fuel tank distal shoulder bracket 35. The step arrangement 16, preferably includes two vertical support members 25. Along the length of the support members 25, preferably, there are a pair of step platforms 30. Positioned above each step platform is a panel mounting bracket 21, each mounting bracket includes a pair of panel mounting bracket apertures 23. As previously described, the mounting bracket apertures 23 align with the step depression mounting bores 20. When a bolt runs through the two openings and is secured by a nut, the panel 18 is effectively mounted to the step arrangement 16.

The construction of the cab step 14 intrinsically allows for its pliable response in a direction along the longitudinal axis of the truck. On the other hand, this pliable response is not associated with the step arrangement 16. Consequently, horizontal responsiveness must otherwise be provided for the step arrangement. The nonobvious solution to this problem is best revealed in FIG. 4.

FIG. 4 is a rear view of the fuel tank 12. The support structure for the fuel tank 12 and the step arrangement 16 are fully appreciated through the figure. The truck frame rail 22 supports the fuel tank distal shoulder 34 which is utilized as a support for the fuel tank distal strap 38. Moreover, the fuel tank distal shoulder 34 serves to support the U bracket 40, which, in turn, supports the top of the step arrangement 16.

The two step platforms 30 are revealed in the figure. The figure also displays how the two panel mounting brackets 21, in conjunction with bolt 44 and nut 45, are connected to the panel 18, more particularly, how they are connected to the panel step depressions 19.

FIG. 4 also depicts how the step arrangement 16 is supported at its bottom end. Tank strap bracket 42 is welded to the fuel tank 12. In turn, the tank strap bracket 42 is connected to link support 50 which reaches to the step arrangement 16 and is attached at its base as depicted in the figure.

The inventive connection between the tank strap bracket 42 and the link support 50 and the step arrangement 16 is novel in the art. In connecting the tank strap bracket 42 to the link support 50, one utilizes a bolt 44 to traverse: a washer 46, a flexible mount 48, the link support 50, and the tank strap bracket 42; this combination is then secured by a nut 45. Attached in this manner, the tank strap bracket 42 and the link support 50 are flexibly movable with respect to one another to a limited extent (based on the resiliency of the flexible mounts 48) about the axis A1. Consequently, one can move relative to the other, thereby allowing motion along the axis of the truck.

The flexible mount members 48 are preferably formed of a durable rubber. The shape approximates that of a washer, however, in a preferred embodiment, the flexible mount 48 would be of a thickness approximating a plurality of aligned washers. The flexible mount members 48 allow for rigid vertical support, for instance when a person steps on the step arrangement 16. On the other hand, the flexible mount members 48 allow for a pliable horizontal response about axis A1 when the panel 18, which is fixedly connected to the step arrangement 16, is subject to horizontal motion (in and out of the figure). That is, motion parallel to the road as in the case of frame twisting or acceleration of the panel 18.

This feature is enhanced by a similar connection between the link support 50 and the step arrangement 16. In connecting the link support 50 and the step arrangement 16, one utilizes a bolt 44 to traverse: a washer 46, a flexible mount 48, the link support 50, and the step arrangement 16; this combination is then secured by a nut 45. This allows the link support 50 and the step arrangement 16 to flex relative to one another in the generally horizontal direction about axis A2.

A similar connection is realized between the U bracket 40 and the fuel tank distal shoulder bracket 35 on the other end of the step arrangement 16. In this case, the brackets 40 and 35 pivot to a limited extent about the axis A3. This connection is most fully appreciated in conjunction with reference to FIG. 5. As depicted by the dotted line, a bolt 44 traverses: a washer 46, the U bracket 40, a flexible mount 49, the fuel tank distal shoulder brackets 35, and a washer 36; once again, this combination is then secured by a nut 45. As with the connections at the bottom of the step arrangement 16, previously described, this connection flexibly connects the U bracket 40 from the fuel tank distal shoulder bracket 35 by allowing the brackets to flex about axis A3 due to the resiliency of flexible mount 49. As such, the two members can move relative to one another, in so doing, they absorb a variety of forces.

The flexible mount 49 is preferably formed from a durable rubber. As seen from the figure, preferably, its shape approximates that of a washer connected to a nut. Alternatively, it may be shaped as flexible mount 48. In either embodiment, this member allows for a modicum of vertical resiliency, but primarily serves to afford the additional resiliency to horizontal forces mentioned immediately above. It is to be noted that this connection is made on both sides of the U bracket 40 although only one connection is depicted in FIG. 5.

Thus, the four flexible connections on the step arrangement: two at the U bracket 40 and two at the base of the step arrangement, act in conjunction with the flexible structure of the cab step 14 to provide a rigid vertical support for the panel 18 while allowing for some flexing of the panel in the horizontal direction. As a result, the panel can accommodate those destructive motions as heretofore described.

Another novel feature of the present invention is also revealed in FIG. 5. The U bracket 40 includes a U bracket mount 52, within the U bracket mount 52 are U bracket mount apertures 54. The U bracket mount apertures 54 are aligned with the step arrangement mount apertures 58 which appear within the step arrangement mount 56 as depicted in FIG. 6. Thus, the step arrangement 16 is supported when a series of nuts and bolts affix the aligned U bracket mount apertures 54 to the step arrangement mount apertures 58.

Without this inventive feature, one would be forced to use a number of different sized fairing panels to fit over the different sized fuel tanks available for a truck, or one would be forced to use a multiplicity of hardware to precisely position the step arrangement at a point to fit a standard sized fairing panel. The present invention obviates these burdensome options. With the present invention, one can use a single sized fairing panel to cover all fuel tanks. Then, regardless of the fuel tank size, and therefore its distal bracket location, the step arrangement can be expeditiously positioned to fit the panel by adjusting the means for variable connection.

As can be seen in FIG. 6, there are variable connections. For instance, by connecting the U bracket 40 to the four step arrangement mount apertures 56 on the far right, the step arrangement can fit over a large fuel tank 12 with a capacity of 150 gallons. On the other hand, if the U bracket is connected to the four mount apertures 58 on the far left, a smaller fuel tank 12 is accommodated, a tank with a capacity of 135 gallons. In both cases, the step arrangement 16 remains a fixed distance from step 14. This is because the apertures 58 are designed to accommodate the difference in length between the tank sizes.

Referring to FIG. 7, it can be appreciated that by using a different step arrangement mount 56', with its step assembly mount apertures 58' on the other side of the step arrangement mount, still different sized fuel tanks can be accommodated. Thus, if the U bracket 40 is attached to the four step arrangement mount apertures 56' on the far left, the step arrangement can fit the smaller fuel tank of 100 gallons. Similarly, if the other four assembly mount apertures are used, a larger tank between 110 and 130 gallons can be accommodated. Again, in both of these latter cases, the apertures are configured so that the distance between the step 14 and the step arrangement 16 remains constant Also, note that the step arrangements in FIGS. 6 and 7 can be used on either side of the truck.

In sum, the variable position of the mount apertures 58 enables one to utilize a single panel 18. As revealed, the positioning of the step arrangement can be modified to accommodate the different sized tanks while placing the steps at the exact position of the panel step depression 18.

Thus, it is apparent that there has been provided, in accordance with the invention, a cab skirt fairing panel mounting assembly that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. An assembly for mounting a cab skirt fairing panel over a truck's fuel tank region lying parallel to the trucks' longitudinal main frame, wherein said fuel tank region includes a cab step positioned adjacent to the proximate end of said fuel tank, and wherein said fuel tank is in close proximity to a step arrangement at its distal end, said assembly comprising:

means for attaching said cab step to said frame in a way which prevents said cab step from moving vertically relative to said frame but allows it to move to a limited extent in a region parallel to said frame;

means for attaching said step arrangement to said frame in a way which prevents said step arrangement from moving vertically relative to said frame but allows it to move to a limited extent in a region parallel to said frame; and means for fixedly attaching opposite ends of said cab skirt panel to said cab step and said step arrangement.

2. The assembly of claim 1 wherein said first-mentioned means comprises: a brace member, a first cab step support panel, and a second cab step support panel, wherein said brace member extends perpendicularly from said longitudinal main frame to support said first and second cab step support panels which extend therefrom in confronting relation and support said cab step therebetween.

3. The assembly of claim 2 wherein said first and said second cab step support panels are formed from aluminum.

4. The assembly of claim 1 wherein said second-mentioned means comprises: a fuel tank, a fuel tank support member, a first link member, a second link member, and a plurality of flexible members, wherein the top of said step arrangement is attached to said fuel tank support member by said flexible members positioned and bolted between said step arrangement and said fuel tank support member, and wherein the bottom of said step arrangement is flexibly movable from said fuel tank by one of said flexible members positioned and bolted between the bottom of said step arrangement and said first link member, said first link member being flexibly movable from said second link member by one of said flexible members positioned and bolted between said first and second link members, and wherein said second link member is fixedly attached at its opposite end to said fuel tank.

5. The assembly of claim 1 wherein said third-mentioned means comprises a panel mounting bracket fixedly secured to said cab step and a plurality of panel mounting brackets fixedly secured to said step arrangement.

6. An assembly for mounting a cab skirt fairing panel in the region between the front and rear wheels of a truck, said region lying parallel to said truck's longitudinal main frame, wherein said region includes a cab step positioned adjacent to the front end of said region, and wherein a step arrangement is at the back end of said region, said assembly comprising:

means for attaching said cab step to said frame in a way which prevents said cab step from moving vertically relative to said frame but allows it to move to a limited extent in a region parallel to said frame;

means for attaching said step arrangement to said frame in a way which prevents said step arrangement from moving vertically relative to said frame but allows it to move to a limited extent in a region parallel to said frame; and means for fixedly attaching opposite ends of said cab skirt fairing panel to said cab step and said step arrangement.

* * * * *